United States Patent
Kwak (10) Patent No.: US 6,262,995 B1
(45) Date of Patent: Jul. 17, 2001

(54) ASYNCHRONOUS TRANSFER MODE ADAPTATION LAYER (AAL) PROCESSING METHOD

(75) Inventor: Jong-In Kwak, Seoul (KR)

(73) Assignee: Hyundai Electronics Ind. Co., Ltd., Kyoungki-do (KR)

(*) Notice: Subject to any disclaimer, the term of this patent is extended or adjusted under 35 U.S.C. 154(b) by 0 days.

(21) Appl. No.: 09/053,276

(22) Filed: Apr. 1, 1998

(30) Foreign Application Priority Data

Jun. 28, 1997 (KR) .................................................. 97-28639

(51) Int. Cl.[7] .................................................. H04L 12/56
(52) U.S. Cl. ............................ 370/469; 370/466; 370/474
(58) Field of Search .................................. 370/395, 401, 370/463, 466, 469, 474, 476

(56) References Cited

U.S. PATENT DOCUMENTS

| | | |
|---|---|---|
| 5,490,140 | 2/1996 | Absensour et al. . |
| 5,490,141 | 2/1996 | Lai et al. . |
| 5,537,408 | 7/1996 | Branstad et al. . |
| 5,717,691 * | 2/1998 | Dighe et al. ........................... 370/401 |
| 5,751,698 * | 5/1998 | Cushman et al. ..................... 370/252 |
| 5,867,677 * | 2/1999 | Tsukamoto ............................ 710/131 |
| 5,999,529 * | 12/1999 | Bernstein et al. ..................... 370/376 |
| 6,075,788 * | 6/2000 | Vogel .................................... 370/395 |
| 6,075,798 * | 6/2000 | Lyons et al. .......................... 370/474 |

* cited by examiner

Primary Examiner—Min Jung
(74) Attorney, Agent, or Firm—Reed Smith LLP

(57) ABSTRACT

An asynchronous transfer mode adaptation layer (AAL) processing apparatus using a central processing unit in an asynchronous transfer mode (ATM) terminal includes: a physical layer for performing physical functions and supporting universal test and operations physical interface for ATM (UTOPIA); a software segmentation and reassembly interface device (SSID) for storing ATM cells outputted by the physical layer in a double port RAM under the control of a central processing unit and outputting to the physical layer the ATM cells, which have been stored in the double port RAM by the central processing unit, under the control of the central processing unit; a double port RAM for storing the ATM cells depending upon the control of the central processing unit or the SSID; a system memory for temporarily storing the ATM cells of the central processing unit; and a central processing unit, for storing in the double port RAM the user data, produced by reassembly of the ATM cells stored in the double port RAM, for storing in the double port RAM the ATM cells produced by segmentation of the user data stored in the double port RAM, and for controlling the overall system.

6 Claims, 13 Drawing Sheets

ASYNCHRONOUS TRANSFER MODE ADAPTATION LAYER (AAL) PROCESSING METHOD

BACKGROUND OF THE INVENTION

1. Field of the Invention

The present invention relates to an asynchronous transfer mode adaptation layer (AAL) processing apparatus and method in an asynchronous transfer mode (ATM). Particularly, this invention allows a central processing unit to process AAL1, AAL3/4, and AAL5 using a software segmentation and reassembly interface device (SSID) in ATM.

2. Discussion of Related Art

In general, ATM is a transfer/exchange technique which is a core of a broadband integrated services digital network (B-ISDN), where all information is treated in units of data called cells. An ATM terminal indicates a device which performs telephone service using the ATM. It has functions such as selection, establishment, and error detection of a communication channel. The ATM cell has 53-byte length including a 5-byte central header and a 48-byte information field. This fixed length data row is utilized as a unit for multiple exchange.

There are four types such as AAL1, AAL2, AAL3/4, and AAL5 in an ATM application layer (AAL). The AAL1 transmits a service data unit (SDU) of a constant bit rate at the same bit rate, performs transmission of time information between information source and destination, and displays errors and error correction. The AAL2 transmits the SDU at a variable bit rate, performs transmission of the time information between the source and destination, and displays errors and error correction. The AAL3 and AAL4 offer non-real time and variable bit rate services from an AAL-SAP (AAL-service access point) to an ATM-SAP, provide multiplexing service in the AAL, and have a function of transferring in connection-oriented or connectionless mode. The AAL5 simplifies the functions and process of the AAL3/4, thus performing functions compatible with high speed data transmission.

Figure 1:
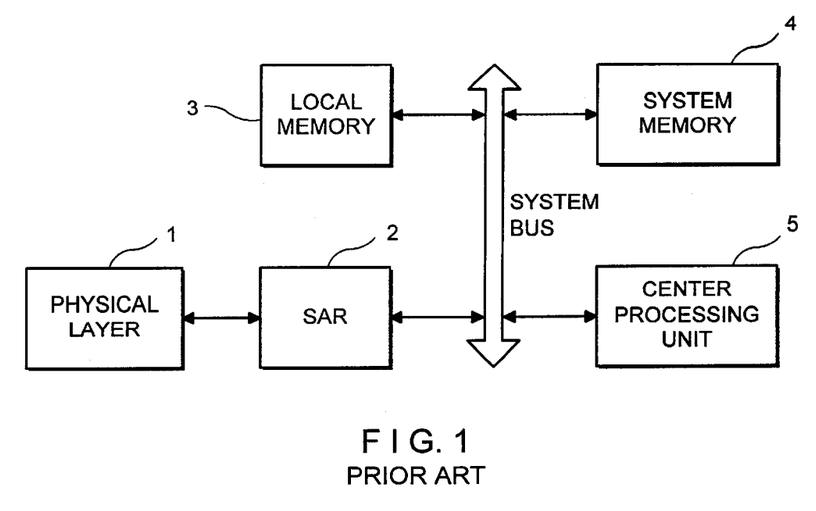
FIG. 1 is a block diagram of a conventional AAL processing apparatus using an SAR in ATM.

Such a conventional ATM exchange employs a segmentation and reassembly (SAR) to allow a central processing unit to process AAL functions. As shown in FIG. 1, the conventional ATM exchange includes: a physical layer 1 for performing physical layer functions and supporting Universal Test and Operations Physical Interface for ATM (UTOPIA); an SAR 2 for reassembling an ATM cell outputted by the physical layer 1 to produce user data, reproducing the user data outputted by a central processing unit 5 in a form of an ATM cell through segmentation and transmitting the ATM cell to the physical layer 1, and performing ATM and AAL functions; a local memory 3 for storing the user data and control information used when the SAR 2 performs the segmentation and reassembly; a system memory 4 for storing data and various control information for the central processing unit 5; and the central processing unit 5 for initializing the physical layer 1 and SAR 2 and processing interrupts.

The following description is about the operation of such conventional AAL processing apparatus using the SAR in the ATM with reference to the attached drawings. An ATM cell outputted by the physical layer 1 is inputted to the SAR 2 through the UTOPIA. The SAR 2 reassembles internet protocol (IP) datagram which is fragmented at a start or central node to reconstruct the original IP datagram as user data. The central processing unit 5 then processes the user data. The SAR 2 performs the segmentation of the user data processed by the central processing unit 5 to construct an ATM cell and transmits the cell via the physical layer 1.

In the conventional apparatus, however, the part for processing the ATM and AAL is formed in hardware, so there are problems that the hardware must be differently configured according to the types of the AAL, such as AAL1, AAL2, AAL3/4, and AAL5, resulting in necessity of creating new hardware design and board.

SUMMARY OF THE INVENTION

Accordingly, the present invention is directed to an AAL processing apparatus and method using a central processing unit in an ATM terminal that substantially obviates one or more of the limitations and disadvantages of the related art.

The present invention is aimed at overcoming the drawbacks occurring when the central processing unit processes multiple AALs in the conventional ATM terminal. An object of the present invention is to provide an AAL processing apparatus using a central processing unit in an ATM terminal, which allows transmission of ATM cells between the central processing unit and software SAR interface device (SSID) so as to process AAL1, AAL3/4, and AAL5 in the ATM terminal.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, an asynchronous transfer mode adaptation layer (AAL) processing apparatus using a central processing unit in an asynchronous transfer mode (ATM) terminal includes: a physical layer for performing physical functions and supporting universal test and operations physical interface for ATM (UTOPIA); a software segmentation and reassembly interface device (SSID) for storing ATM cells outputted by the physical layer in a double port RAM under the control of a central processing unit and outputting to the physical layer the ATM cells, which have been stored in the double port RAM by the central processing unit, under the control of the central processing unit; a double port RAM for storing the ATM cells depending upon the control of the central processing unit or the SSID; a system memory for temporarily storing the ATM cells of the central processing unit; and a central processing unit, for storing in the double port RPM the user data, produced by reassembly of the ATM cells stored in the double port RAM, for storing in the double port RAM the ATM cells produced by segmentation of the user data stored in the double port RAM, and for controlling the overall system.

In another aspect, the present invention provides an AAL processing method using a central processing unit in an ATM terminal, which allows transmission of ATM cells between the central processing unit and software SAR interface device (SSID) so as to process AAL1, AAL3/4, and AAL5 in the ATM terminal.

To achieve the above objective, an asynchronous transfer mode adaptation layer (AAL) processing method using a central processing unit in an asynchronous transfer mode (ATM) terminal includes the steps of: reading user data from a system memory and determining whether the user data for AAL1 is read; segmenting the user data with the AAL1 if the user data read is for AAL1; and segmenting the user data with AAL3/4 or AAL5 if the user data read is not for the AAL1.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is composed of FIGS. 5a, 5b, 5c, and 5d and shows a flow chart of user data process using the AAL1 depicted in FIG. 4;

FIG. 6 is composed of FIGS. 6a, 6b, 6c and 6d and shows a flow chart of user data process using the AAL3/4 and AAL5 depicted in FIG. 4;

DETAILED DESCRIPTION OF PREFERRED EMBODIMENT

Reference will now be made in detail to the preferred embodiments of the present invention, examples of which are illustrated in the accompanying drawings.

Figure 2:
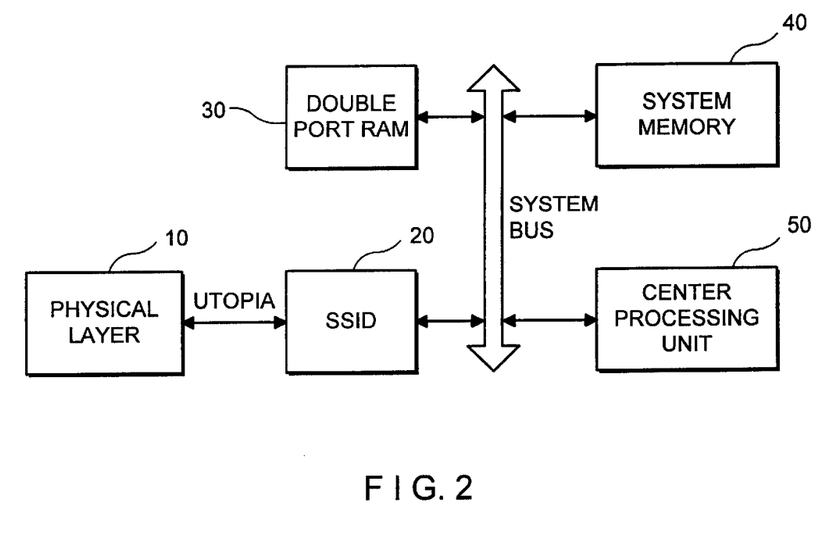
FIG. 2 is a block diagram of an AAL processing apparatus using an SSID in an ATM terminal according to the present invention.

FIG. 2 is a block diagram of an AAL processing apparatus using an SSID in an ATM terminal according to the present invention. As shown in the drawing, the AAL processing apparatus of this invention includes: a physical layer 10 for performing physical functions and supporting UTOPIA; an SSID 20 for storing ATM cells outputted by the physical layer 10 in a double port RAM 30 under the control of a central processing unit 50 and outputting to the physical layer 10 the ATM cells, which have been stored in the double port RAM 30 by the central processing unit 50, under the control of the central processing unit 50; a double port RAM 30 for storing the ATM cells depending upon the control of the central processing unit 50 or the SSID 20; a system memory 40 for temporarily storing the ATM cells of the central processing unit 50; and the central processing unit 50, for storing in the double port RAM the user data, produced by reassembly of the ATM cells stored in the double port RAM, for storing in the double port RAM the ATM cells produced by segmentation of the user data stored in the double port RAM 30, and for controlling the overall system.

Figure 3:
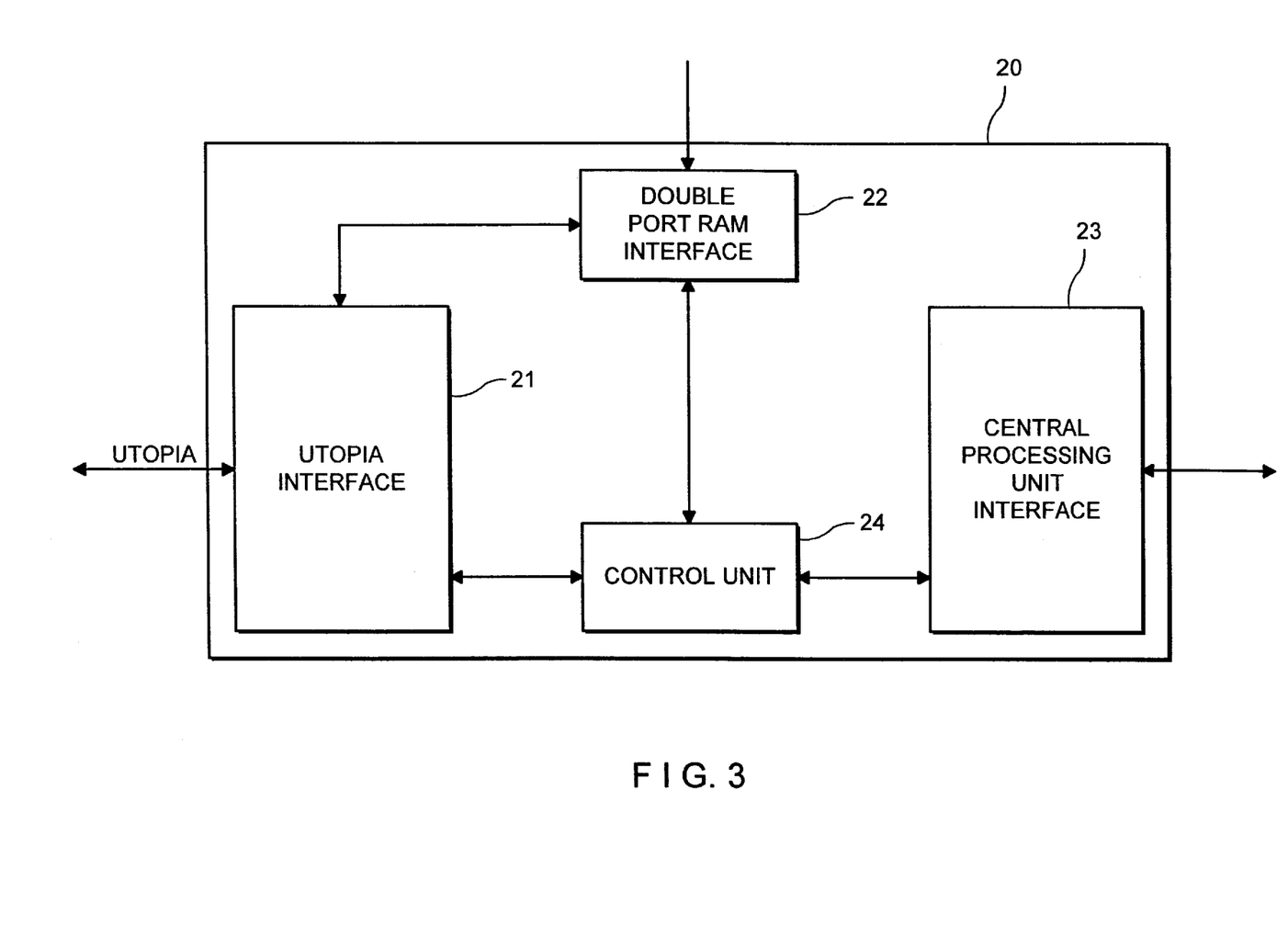
FIG. 3 is a detailed block diagram of the SSID depicted in FIG. 2.

The SSID 20, as shown in FIG. 3, includes: a UTOPIA interface 21 for giving warning when the ATM cells from the physical layer 10 are accumulated in an internal buffer and transferring the ATM cells temporarily stored in the internal buffer to a double port RAM interface 22 when a control signal corresponding to the warning is inputted thereto, and for receiving the ATM cells from the double port RAM interface 22 and transmitting them to the physical layer 10 according to the control signal inputted thereto; a double port RAM interface 22 for storing in the double port RAM 30 the ATM cells inputted thereto according to the inputted control information or for reading the ATM cells stored in the double port RAM 30; a central processing unit interface 23 for performing data communication with the central processing unit 50 according to the inputted control information; and a control unit 24 having internal local memory, for controlling functions of the UTOPIA interface 21 and double port RAM interface 22, for transferring to the central processing unit interface 23 the control information to be transferred to the central processing unit 50, and for performing overall control according to the control information transferred from the central processing unit 50.

Figure 4:
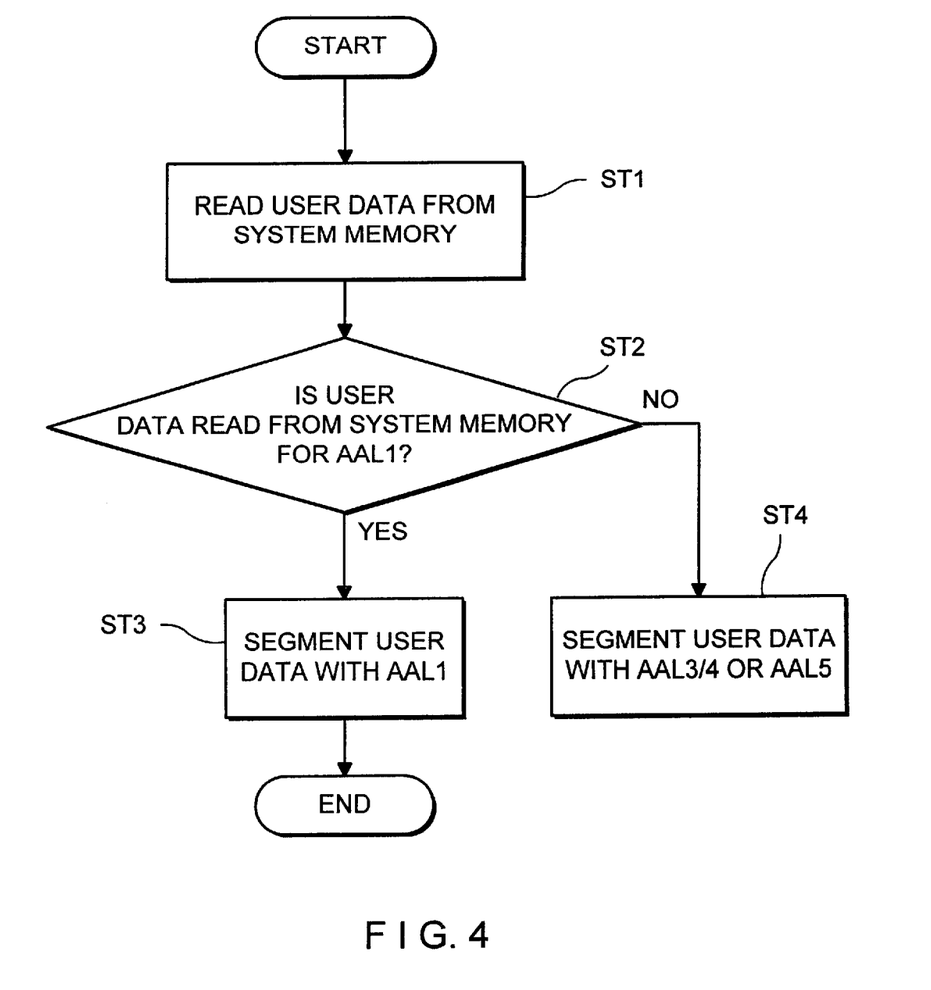
FIG. 4 is a flow chart showing an embodiment of user data process using AAL1, AAL3/4, and AAL5 according to the present invention.

FIG. 4 is a flow chart showing an embodiment of user data process using AAL1, AAL3/4, and AAL5 according to the present invention. As shown in the drawing, the process includes the steps of: reading the user data from the system memory 40 and determining whether user data for AAL1 is read (ST1 and ST2); segmenting the user data with the AAL1 if the user data read is for AAL1 (ST3); and segmenting the user data with AAL3/4 or AAL5 if the user data read is not for the AAL1 (ST4).

During the step of reading the user data from the system memory 40 and determining whether the user data read is for AAL1 (ST1 and ST2), the area of the system memory 40 is broken down into three AAL1's, AAL3/4's, and AAL5's user data areas and the user data is written to a memory area predetermined at application so as to determine whether the user data read is for the AAL1.

The step of segmenting the user data with the AAL1 (ST3), as shown in FIG. 5, includes the sub-steps of: segmenting the user data with AAL1, and, after storing the ATM cells corresponding to the AAL1 in the system memory, generating the interrupt against the SSID 20 to obtain the use of the double port RAM 30 and storing the ATM cells of the system memory 40 in the double port RAM 30 when the SSID 20 is using the double port RAM 30, and storing the ATM cells in the double port RAM 30 when the SSID 20 is not using the double port RAM 30 (ST11–ST21); reading the ATM cells stored in the double port RAM 30 using the SSID 20 and transferring them to the physical layer 10 (ST22–ST24); when the ATM cells corresponding to the AAL1 are transmitted from the physical layer 10 to the SSID 20, allowing the SSID 20 to obtain the use of the double port RAM 30 and store the ATM cells in the double port RAM 30 (ST25–ST31); and allowing the central processing unit 50 to obtain the use of the double port RAM 30, read and reassemble the ATM cells stored in the double port RAM 30, and output the user data (ST32–ST36).

The step of segmenting the user data with AAL3/4 or AAL5, as shown in FIG. 6, includes the sub-steps of: converting the user data for the AAL3/4 or AAL5 into a convergence sublay-protocol data unit (CS-PDU) and then segmenting it, after storing the ATM cells including a trailer of the CS-PDU in the system memory 40, generating the interrupt agains the SSID 20 to obtain the use of the double port RAM 30 and storing the ATM cells of the system memory 40 in the double port RAM 30 when the SSID 20 is using the double port RAM 30, and storing the ATM cells in the double port RAM 30 when the SSID 20 is not using the double port RAM 30 (ST41–ST52); reading the ATM cells stored in the double port RAM 30 using the SSID 20 and transmitting the ATM cells to the physical layer 10 (ST53–ST55); when the ATM cells corresponding to the AAL3/4 or AAL5 are transmitted from the physical layer 10 to the SSID 20, allowing the SSID 20 to obtain the use of the double port RAM 30 and store the ATM cells in the double port RAM 30 (ST56–ST62); and allowing the central processing unit 50 to obtain the use of the double port RAM 30, to read and assemble the ATM cells stored in the double port RAM 30, and to output the user data (ST63–ST67).

Figure 7:
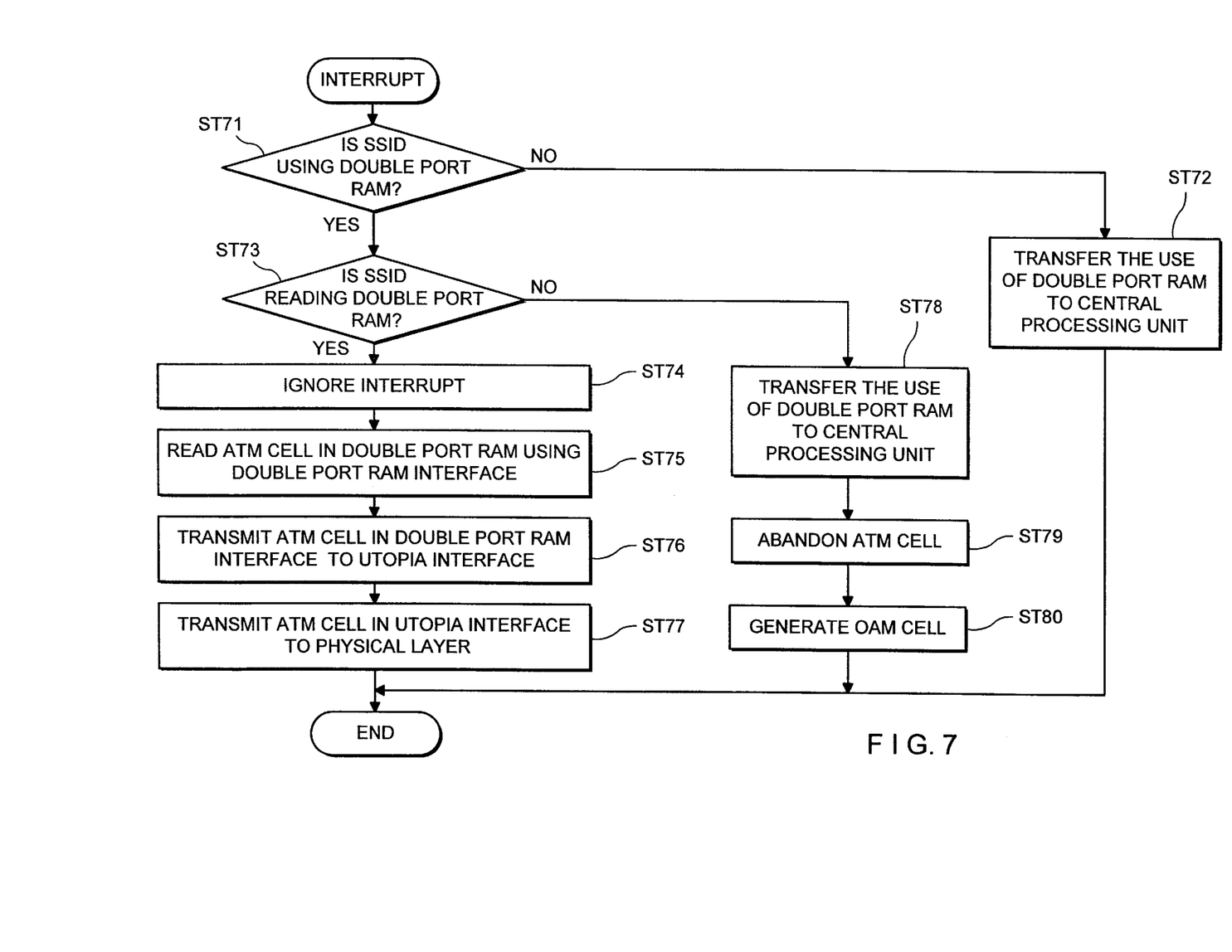
FIG. 7 is a flow chart showing operation of the SSID progressing when the central processing unit generates an interrupt of the use of a double port RAM against the SSID as depicted in FIG. 5 or 6.

The steps ST16 and ST47 where the central processing unit 50 generates the interrupt against the SSID 20, as shown in FIG. 7, include sub-steps of: transferring the use of the double port RAM 30 to the central processing unit 50 when the SSID 20 is using the double port RAM 30 and determining whether the SSID 20 is reading the double port RAM 30 if the SSID 20 is not using the double port RAM 30 (ST71–ST73); reading the ATM cells from the double port RAM 30 and transmitting them to the physical layer 10 in disregard of the interrupt if the SSID 20 is reading the double port RAM 30 (ST74–ST77); and abandoning the ATM cells and generating an operation and management (OAM) cell when the SSID 20 is not reading the double port RAM 30 (ST78–ST80).

Figure 8:
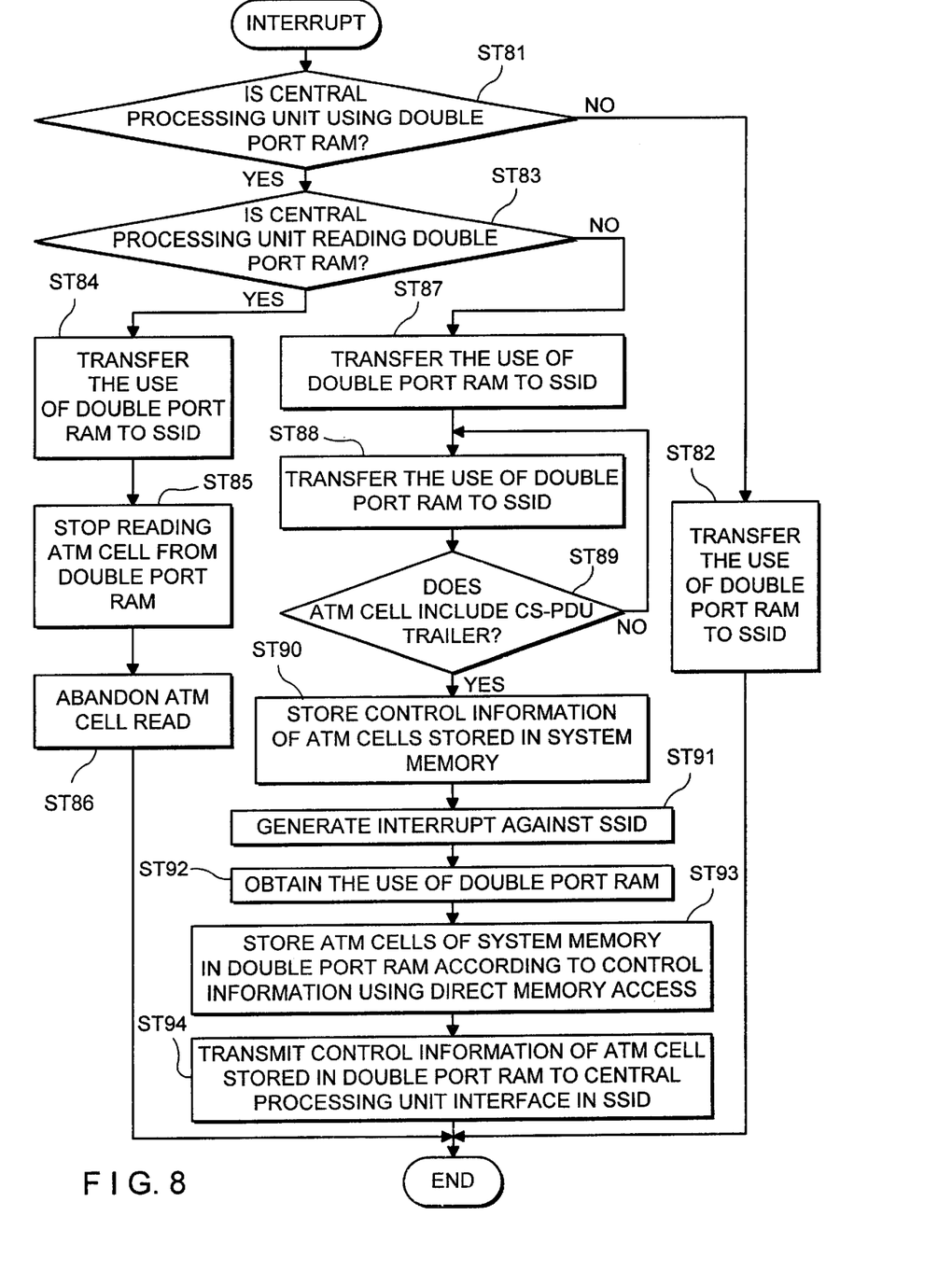
FIG. 8 is a flow chart showing operation of the central processing unit progressing when the SSID generates an interrupt of the use of a double port RAM against the central processing unit as depicted in FIG. 5 or 6.

The steps ST26 and ST57 where the SSID 20 generates the interrupt against the central processing unit 50, as shown in FIG. 8, include sub-steps of: transferring the use of the double port RAM 30 to the SSID 20 when the central processing unit 50 is using the double port RAM 30 and determining whether the central processing unit 50 is reading the double port RAM 30 when the central processing unit 50 is not using the double port RAM 30 (ST81–ST83); transferring the use of the double port RAM 30 to the SSID 20 and abandoning the ATM cells when the central processing unit 50 is reading the double port RAM 30 (ST84–ST86); storing the ATM cells in the system memory 40 and determining whether the ATM cells include the trailer of CS-PDU when the central processing unit 50 is not reading the double port RAM 30 (ST87–ST89); and generating the interrupt against the SSID 20 and storing the ATM cells of the system memory 40 in the double port RAM 30 when the ATM cells include the trailer of the CS-PDU (ST90–ST94).

The AAL processing apparatus and method of this invention having such configuration will be described below in detail with reference to the attached drawings.

The central processing unit 50 reads the use: data from the system memory 40 (ST1), divides the area of the system memory 40 into three areas, such as the AAL1's user data area, the AAL3/4's user data area, and the AAL5's user data area, and writes the user data to a memory area predetermined at the application to determine whether the AAL1's user data is read (ST2).

Figure 5A:
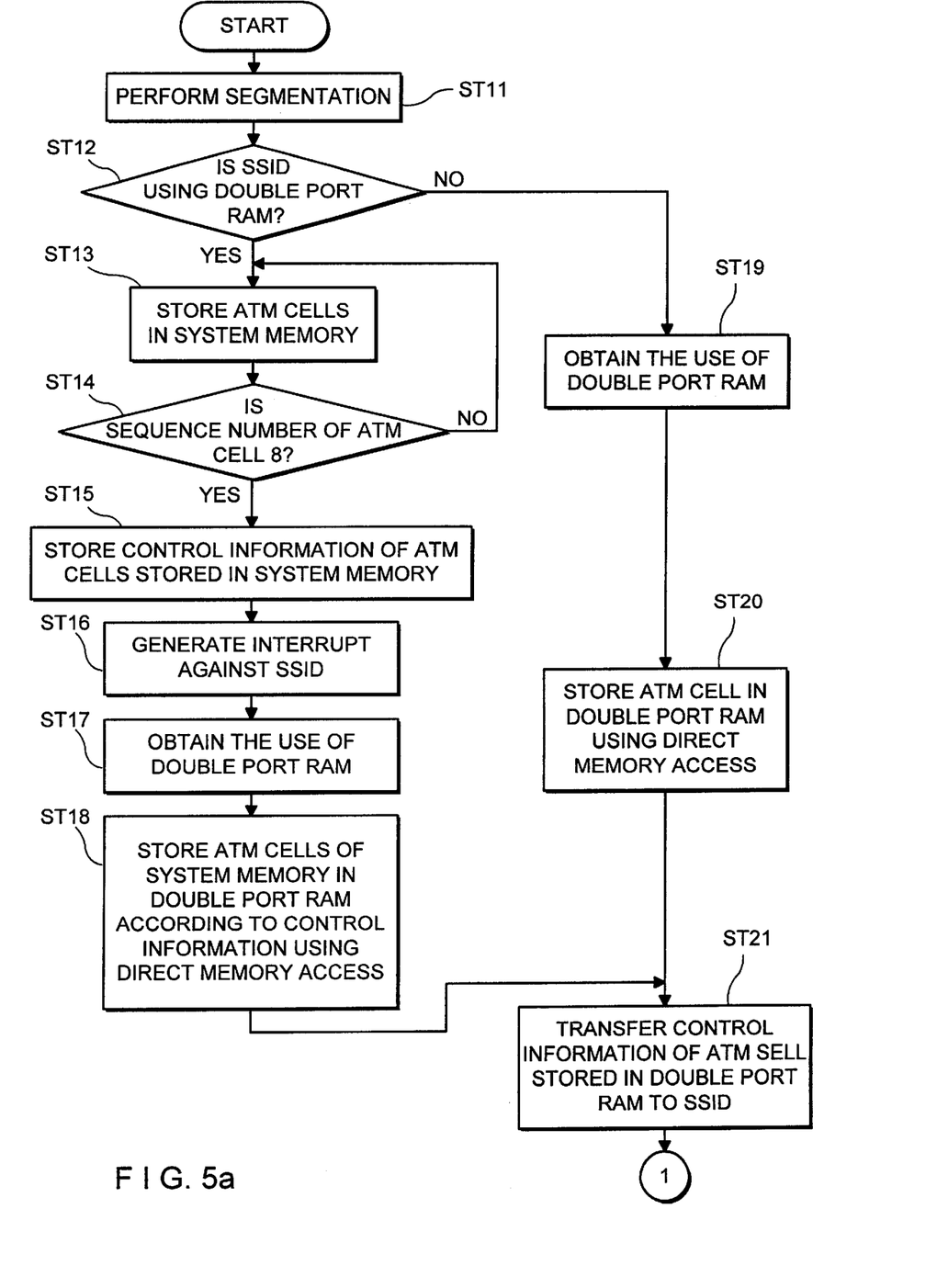

When the user data read from the system memory 40 is for the AAL1, the user data is segmented using the AAL1 (ST3, ST11).

At this time, structure of a segmentation and reassembly-protocol data unit (SAR-PDU) in the AAL1 is as follows.

| SAR-PDU header | | | SAR-PDU payload |
|---|---|---|---|
| CSI | SN | SNP | |
| 1-bit | 3-bit | 4-bit | 47 octets | wherein CSI is a 1-bit convergence sublayer indicator, SN is a 3-bit sequence number, SNP is a 4-bit sequence number protection, and an SAR-PDU payload is composed of 47 octets.

If the SSID 20 is using the double port RAM 30 when the central processing unit 50 is about to use the double port RAM 30, the ATM cells are stored in the system memory 40 until an ATM cell having a sequence number of 8 is detected (ST12–ST14). Voice data should be formed in an ATM cell of 48 octets in order to be transmitted in real time in the AAL1. For such real time transmission, the ATM cells should be transmitted by eights, and the number of the cells can be detected from the 3-bit SN. If the sequence number of the ATM cell is 8, the central processing unit 50 stores the control information of the ATM cells stored in the system memory 40 (ST15), generates the interrupt against the SSID 20 (ST16), and obtains the use of the double port RAM 30 (ST17). A direct memory access (DMA) within the central processing unit 50 stores the ATM cells of the system memory in the double port RAM 30 using the control information stored in itself (ST18) and transfers the control information of the ATM cells stored in the double port RAM 30 to the SSID 20 (ST21).

When the central processing unit 50 generates the interrupt against the SSID 20 (ST16), if the SSID 20 is not using the double port RAM 30, the use of the double port RAM 30 is transferred to the central processing unit: 50 (ST71–ST72), if the SSID 20 is reading the ATM cells from the double port RAM 30, the SSID 20 reads the ATM cells from the double port RAM 30 and transmits the cells to the physical layer 10 in disregard of the interrupt (ST73–ST77), and if the SSID 20 is writing the ATM cells to the double port RAM 30, the use of the double port RAM 30 is transferred to the central processing unit 50 and, after the remaining ATM cells are abandoned, the OAM cell is generated (ST78–ST80).

Figure 5B:
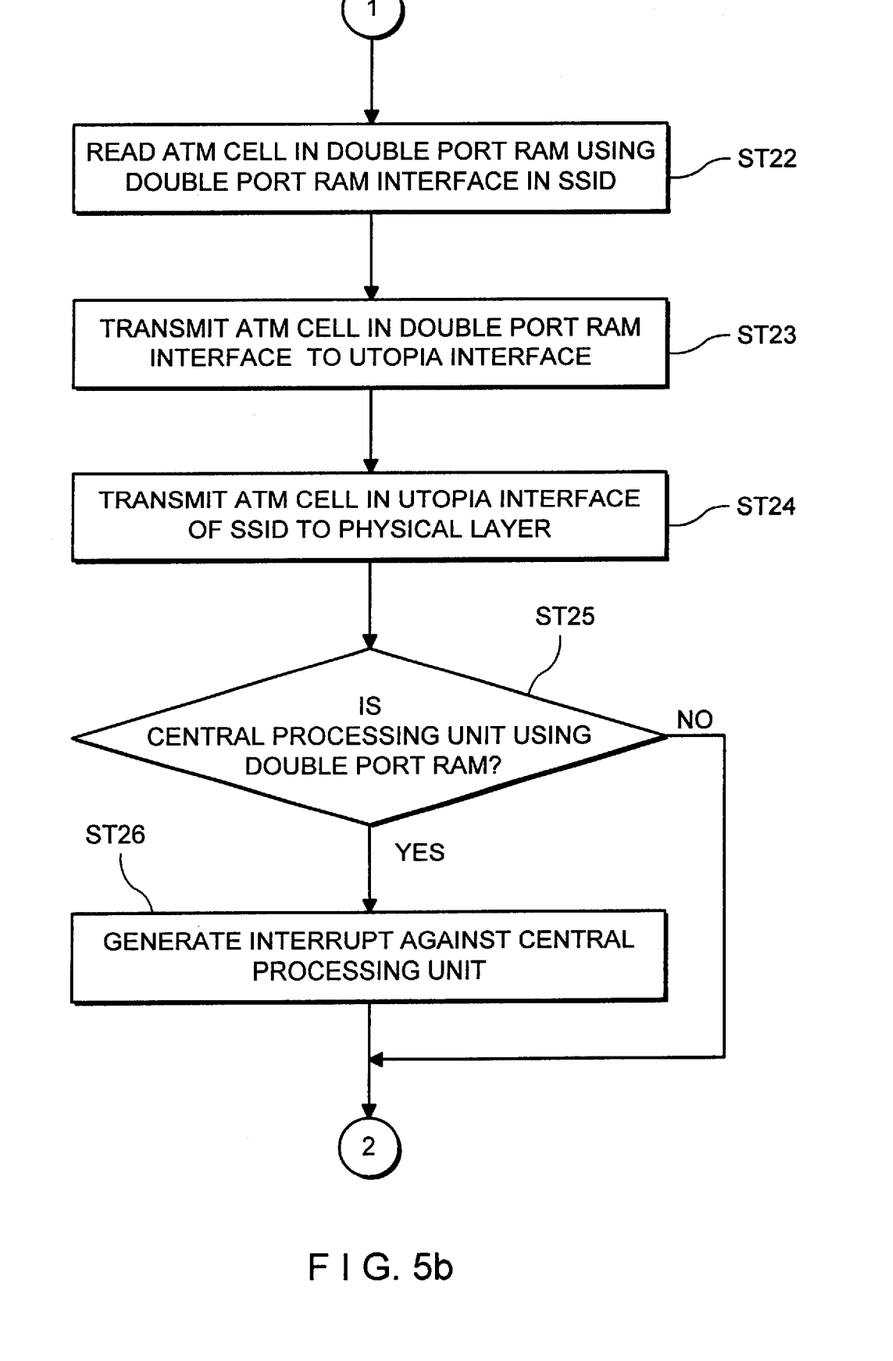

If the SSID 20 is not using the double port RAM 30 (ST12), the ATM cells are written to the double port RAM 30 by eights and their information is transferred to the SSID 20 (ST20–ST21). The SSID 20 then reads the ATM cells from the double port RAM 30 and transmits them to the physical layer 10 (ST22–ST24). If the central processing unit 50 is not using the double port RAM 30 (ST25), the SSID stores the ATM cells in the double port RAM 30 (ST28).

If the central processing unit 50 is using the double port RAM 30, the SSID generates the interrupt against the central processing unit 50 to obtain the use of the double port RAM 30 and stores the ATM cells in the double port RAM 30 (ST26–ST28). In case that the SSID 20 generates the interrupt against the central processing unit 50 (ST26), if the central processing unit 50 is not using the double port RAM 30, the use of the double port RAM 30 is transferred to the SSID 20 (ST81–ST82), if the central processing unit 50 is reading the ATM cells from the double port RAM 30, the use of the double port RAM 30 is transferred to the SSID 20 and the ATM cells which has been read are abandoned (ST83–ST86), and if the central processing unit 50 is writing the ATM cells to the double port RAM 30, the use of the double port RAM 30 is transferred to the SSID 20 and the remaining ATM cells are stored in the system memory 40 (ST87–ST88). When the ATM cells are stored in the system memory, if the ATM cells include the trailer of the CS-PDU, the central processing unit 50 generates the interrupt against the SSID 20 to obtain the use of the double port RAM 30 and stores the ATM cells of the system memory 40 in the double port RAM 30, before transferring the control information to the SSID 20 (ST89–ST94).

Figure 5C:
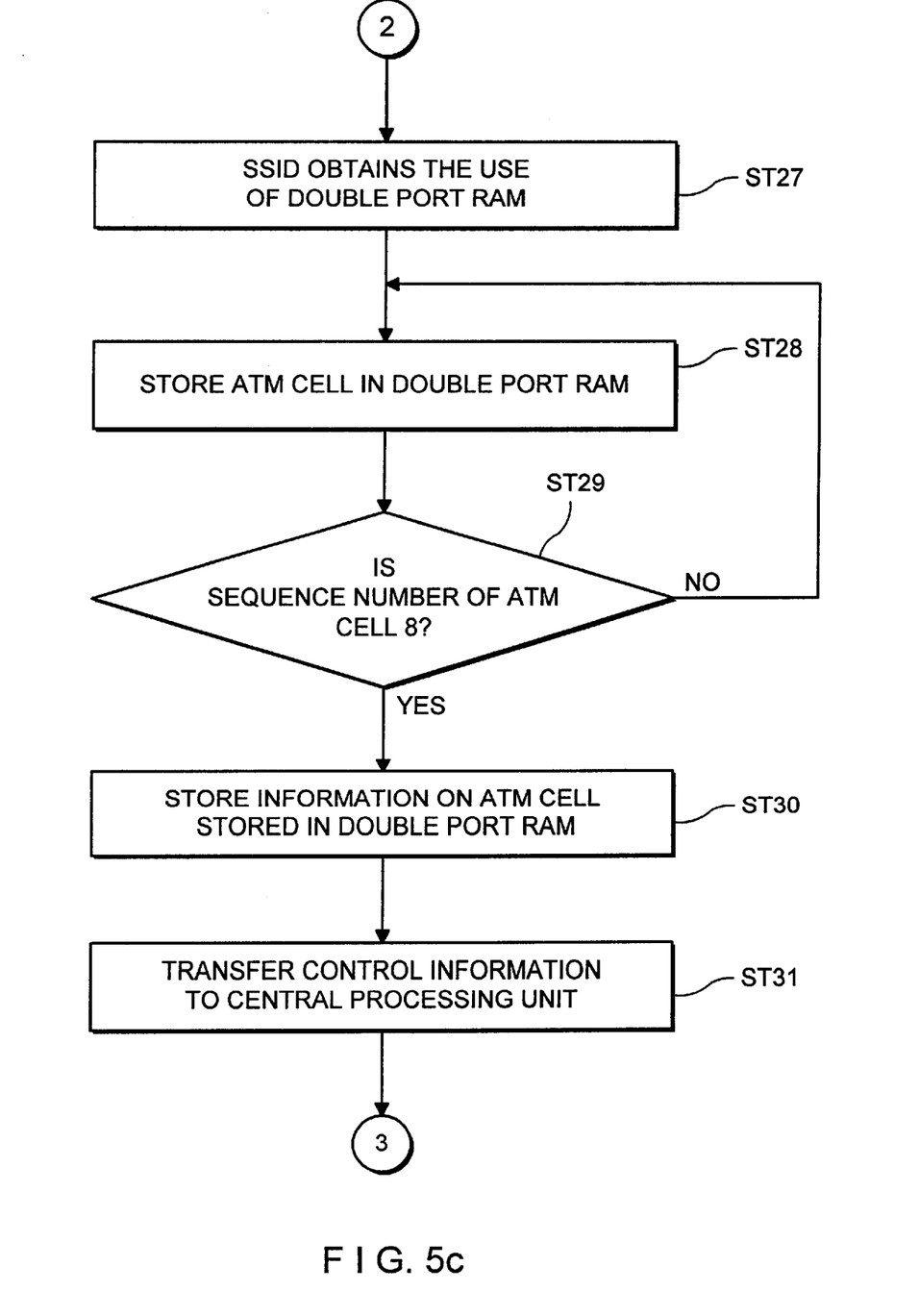
Figure 5D:
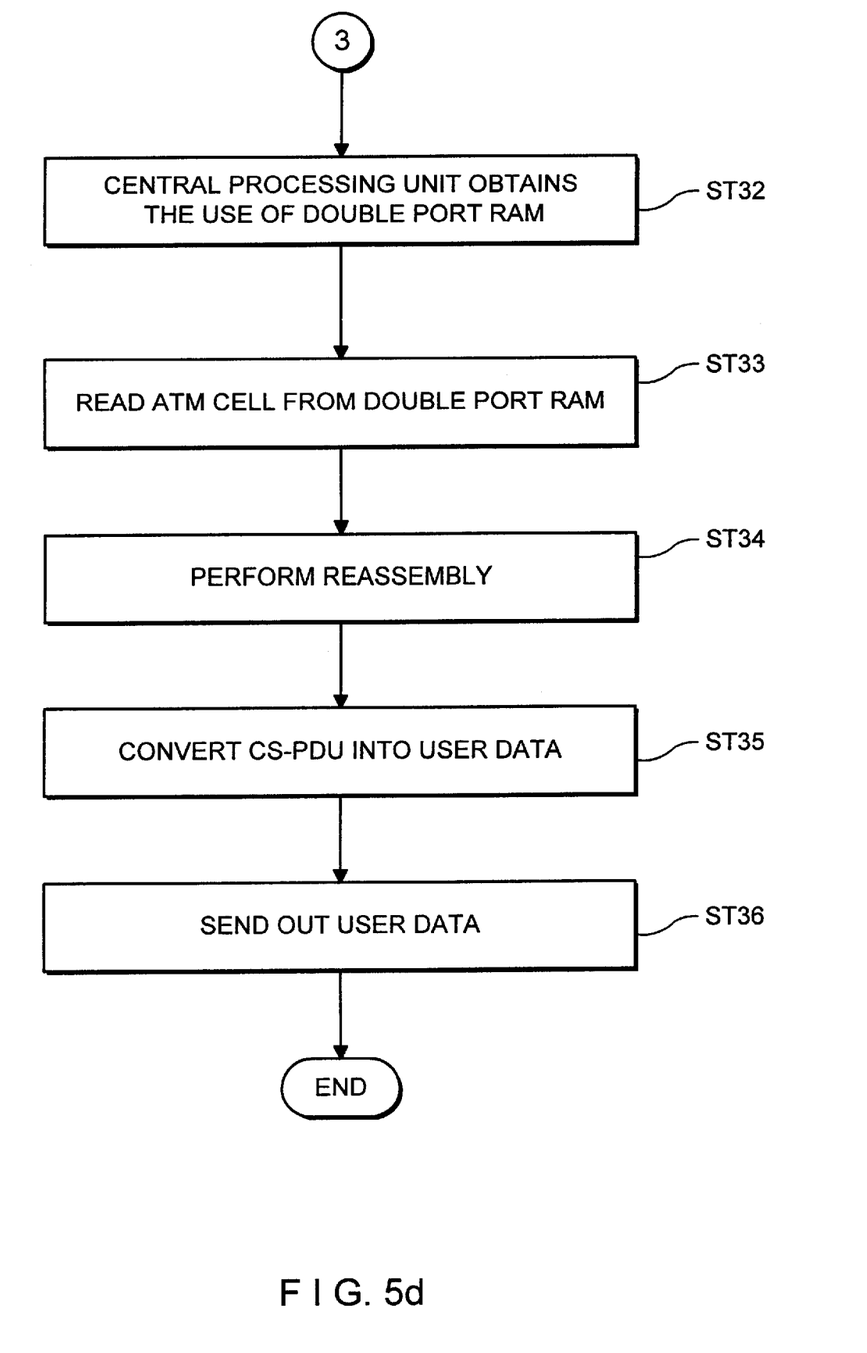

When storing the ATM cells in the double port FRAM (ST28), if the sequence number of the ATM cell is 8 (ST29), the control information of the stored ATM cells is transferred to the central processing unit 50 (ST30–ST31). So the central processing unit 50 obtains the use of the double port RAM 30 and reads the ATM cells from the double port RAM 30 (ST32–ST33). Reassembly is then performed (ST35) and the CS-PDU is constructed (ST35). Finally, the AAL1's user data process is completed by sending out the user data (ST36).

Figure 6A:
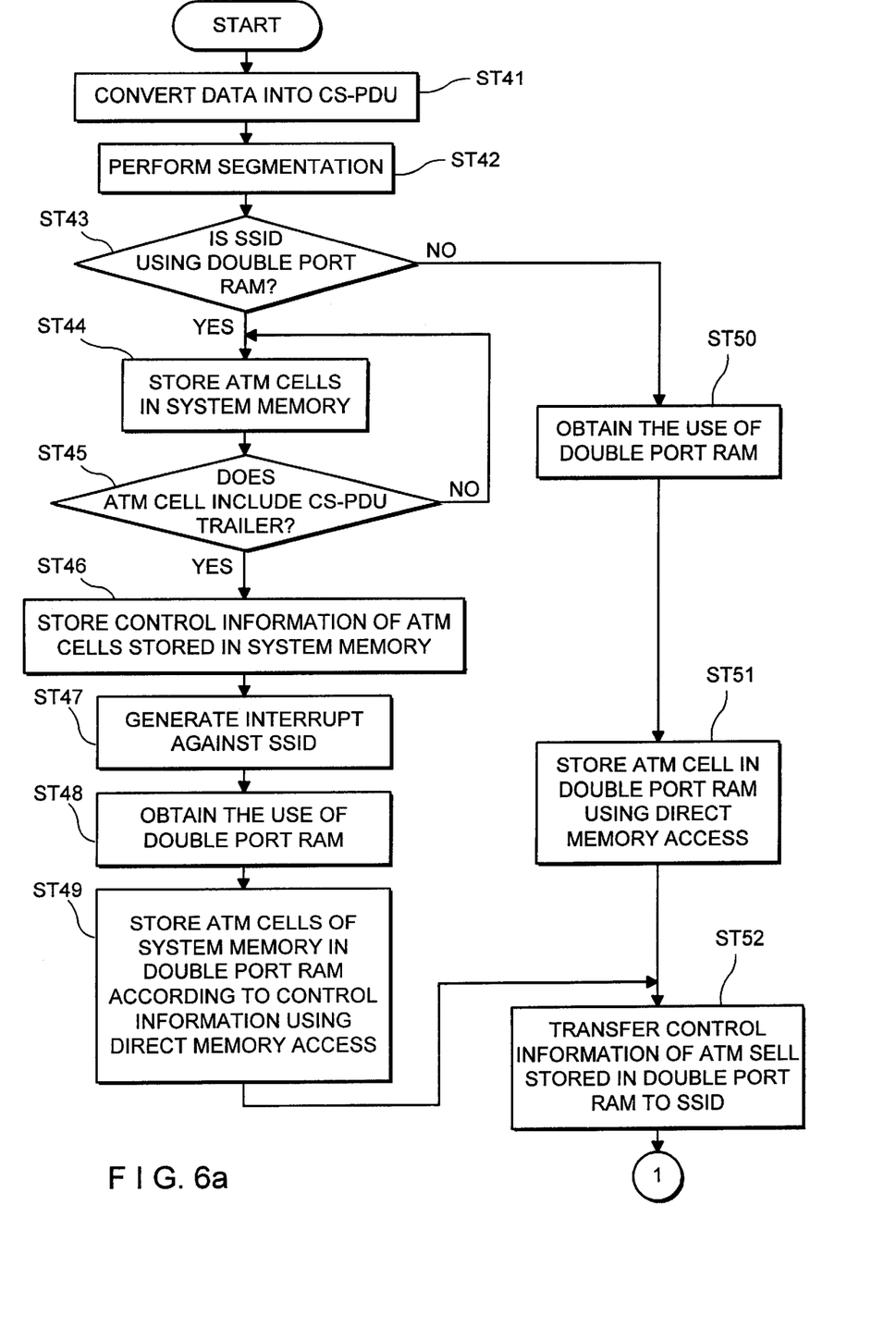

When the central processing unit 50 reads the user data from the system memory 40, if the user data read from the system memory 40 is for the AAL3/4 or AAL5, the user data is converted into the CS-PDU and then segmented (ST2, ST4, ST41, ST42).

At this time, structure of the CS-PDU in the AAL3/4 is as follows.

| CS-PDU header | | | | | CS-PDU trailer | | |
|---|---|---|---|---|---|---|---|
| CSI | Btag | BAsize | CS-PDU payload | PAD | AL | Etag | LI |
| 1-bit | 1-bit | 2-bit | 1–65,563 bits | 0–3 bits | 1-bit | 1-bit | 2-bit | wherein CPI denotes a 1-bit common part indication; Btag and Etag are respectively a 1-bit begin tag and a 1-bit end tag; BAsize is a 2-bit buffer allocation size; PAD is a padding of 0 to 3 bits, AL is a 1-bit alignment, and LI is a 2-bit length indication for indicating the length of the header. The CS-PDU trailer is composed of the AL, Etag, and LI of total 4 bits.

The following is structure of the CS-PDU in the AAL5.

| | | CS-PDU trailer | | | |
|---|---|---|---|---|---|
| CS-PDU payload | PAD | CS-UU | CPI | LI | CRC |
| 1–65,536 bits | 0–47 bits | 1-bit | 1-bit | 2-bit | 4-bit | wherein PAD is a padding of 0 to 3 bits, CS-UU denotes a convergence sublayer-user-to-user of 0 to 47 bits, CPI is a 1 bit common part indication, LI is a 2-bit length indication for indicating the length of the header, and CRC is a 4-bit cyclic redundancy check. The trailer part of the CS-PDU is composed of the CS-UU, CPI, LI, and CRC of total 8 bits.

Figure 6B:
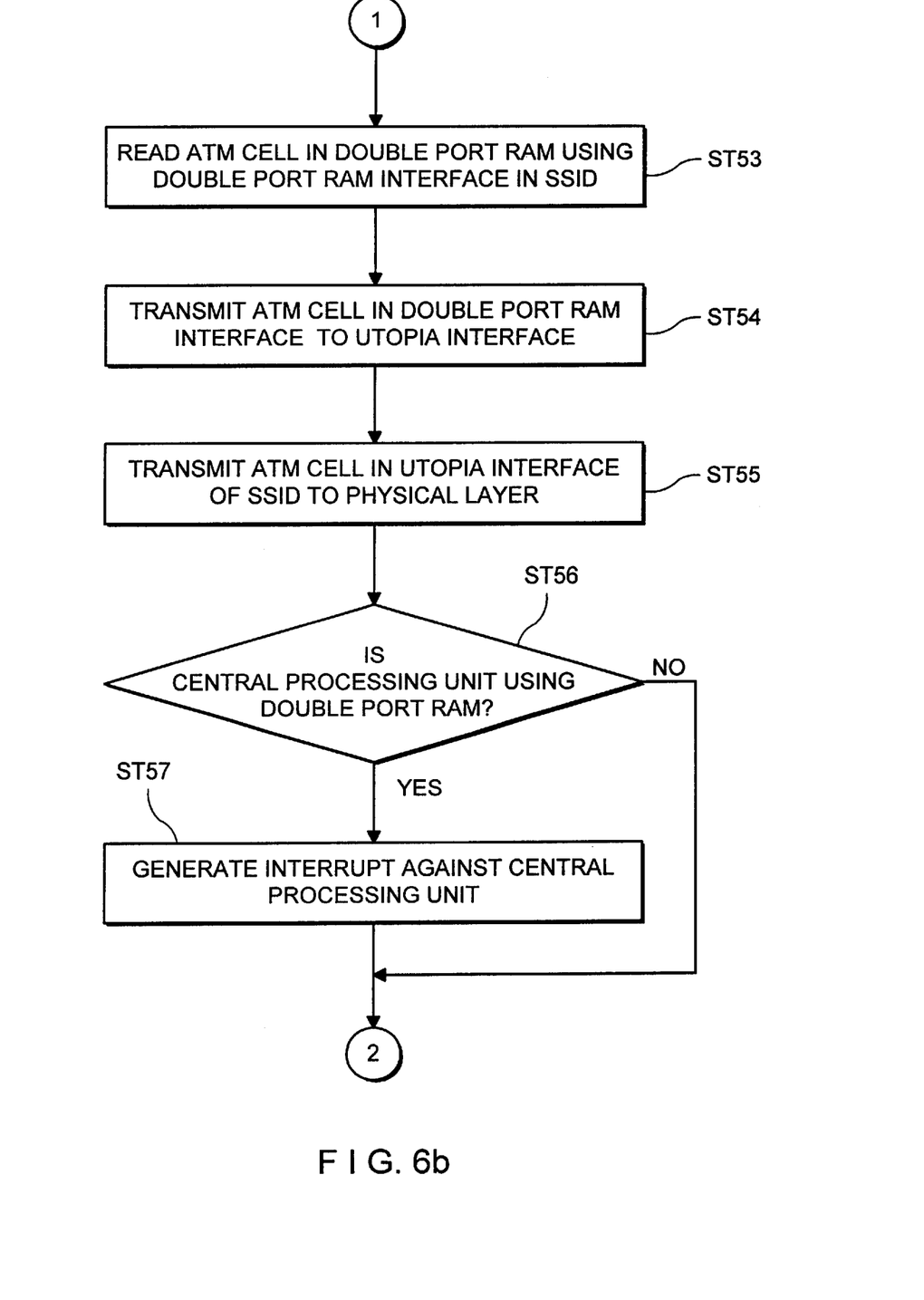

When the central processing unit 50 is about to write to the double port RAM 30, if the SSID is using the double port RAM 30, the ATM cells are temporarily stored in the system memory 40 and the ATM cells are checked to find whether the cells include the CS-PDU trailer (ST43–ST45). If the ATM cells include the CS-PDU trailer, the control information of the ATM cells stored in the system memory 40 is stored, the central processing unit generates the interrupt against the SSID 20 to obtain the use of the double port RAM 30, the DMA in the central processing unit 50 stores the ATM cells of the system memory 40 in the double port RAM 30 using the control information stored in itself, and the control information of the ATM cells stored in the double port RAM 30 is transferred go the SSID 20 (ST46–ST49). At this time, if the central processing unit 50 generates the interrupt against the SSID 20 (ST16), the steps ST71 to ST80 illustrated above progress. On the other hand, if the SSID 20 is not using the double port RAM 30 (ST43), the ATM cells are written to the double port RAM 30 eight by eight and their information is transferred to the SSID 20 (ST50–ST52).

Figure 6C:
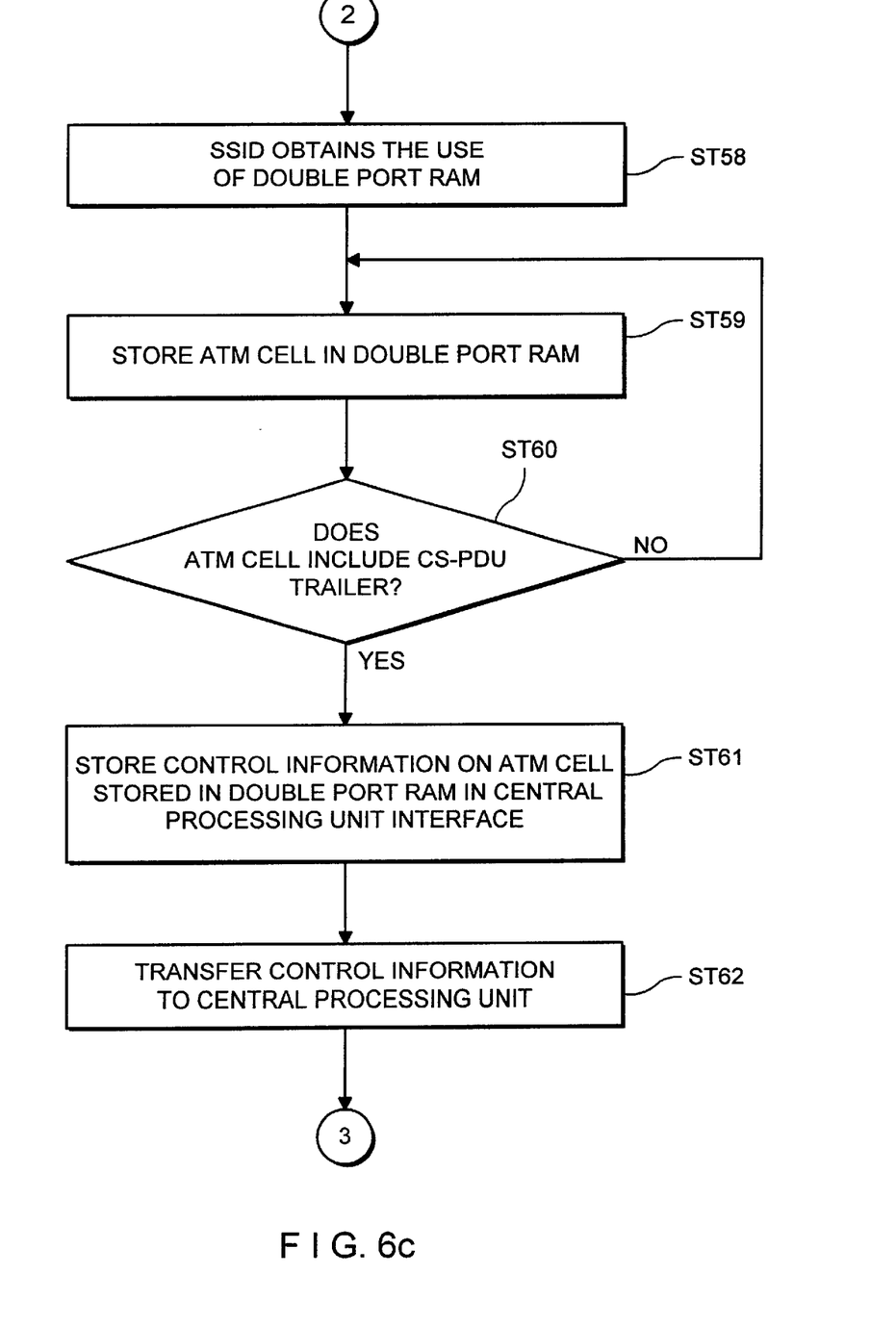

The SSID 20 then reads the ATM cells from the double port RAM and transfers them to the physical layer 10 (ST53–ST55). If the central processing unit 50 is not using the double port RAM 30, the ATM cells are stored in the double port RAM 30 (ST56). If the central processing unit 50 is using the double port RAM 30, the SSID obtains the use of the double port RAM 30 and stores the ATM cells in the double port RAM 30 (ST57–ST59). When the SSID generates the interrupt against the central processing unit 50 (ST57), the steps ST81 to ST94 then progress.

Figure 6D:
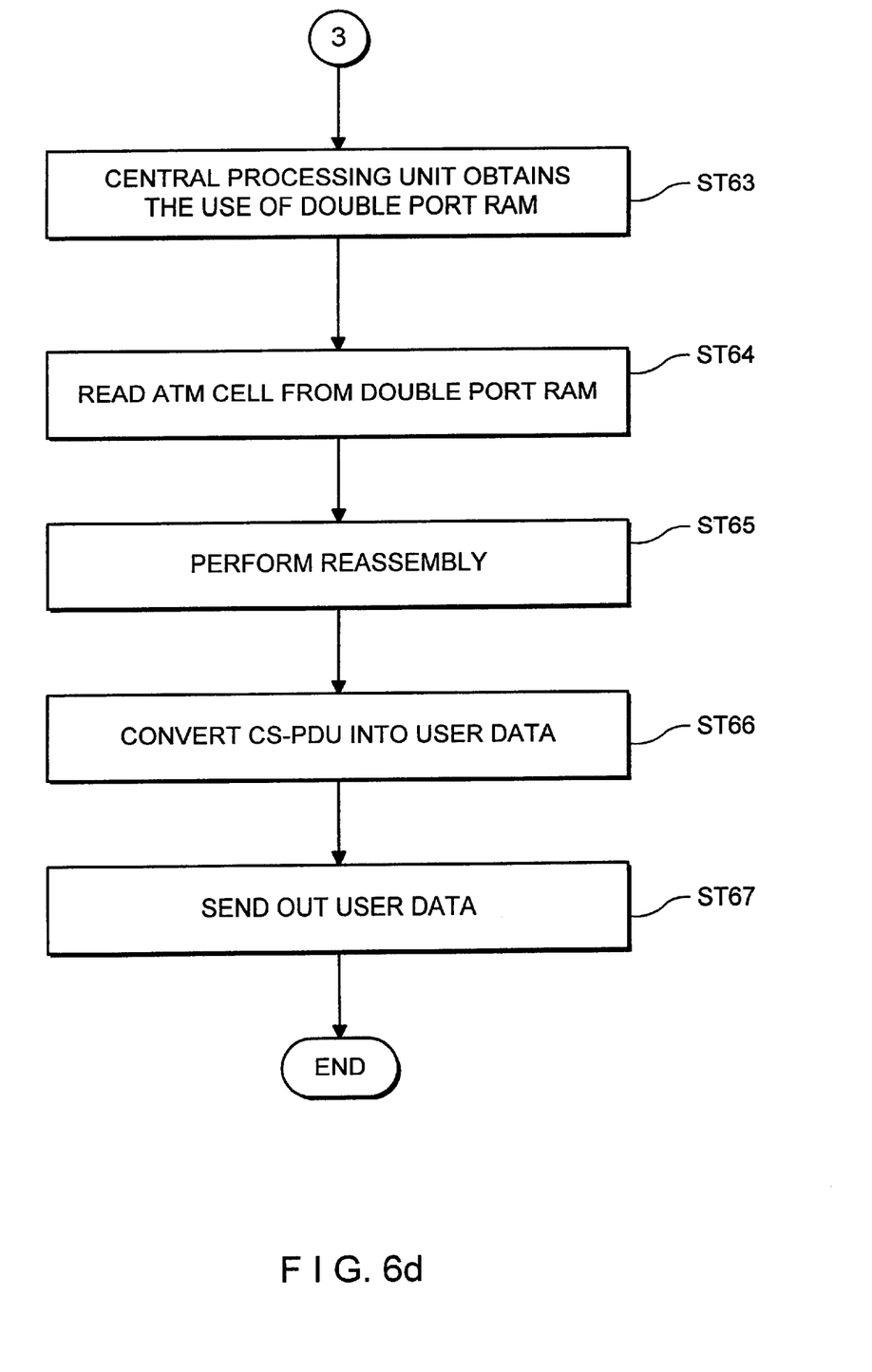

When the ATM cell is stored in the double port RAM 30 (ST59), if the ATM cell includes the CS-PDU trailer (ST60), the control information of the ATM cell stored is transferred to the central processing unit 50 (ST61–ST62). So the central processing unit 50 obtains the use of the double port RAM 30 and reads the ATM cells from the double port RAM 30 (ST63–ST64). Reassembly is performed and the CS-PDU is constructed as the user data before sending out (ST65–ST67). Therefor, the user data process using the AAL3/4 or AAL5 is completed.

Accordingly, the present invention allows the AAL to be transmitted between the central processing unit and the SSID in the ATM terminal, thus processing the AAL1, AAL3/4, and AAL5.

According to the present invention, the ATM cell can be transmitted between the central processing unit and the SSID using the SSID in the ATM terminal, thereby allowing the central processing unit to process the AAL1, AAL3/4, and AAL5, resulting in transmission/reception of the ATM cell.

It will be apparent to those skilled in the art that various modifications and variations can be made in an AAL processing apparatus and method using a central processing unit in an ATM terminal of the present invention without deviating from the spirit or scope of the invention. Thus, it is intended that the present invention cover the modifications and variations of this invention provided they come within the scope of the appended claims and their equivalents.

What is claimed is:

1. An asynchronous transfer mode adaptation layer (AAL) processing method using a central processing unit in an asynchronous transfer mode (ATM) terminal, the ATM terminal including a system memory for temporarily storing the ATM cells, a software segmentation and reassembly interface device (SSID) connected with a physical layer to interface with the physical layer the ATM cells, a double port RAM connected with the SSID for storing and drawing the ATM cells, and a central processing unit connected with the SSID for interfacing control information and for controlling a transmission and a reception of the ATM cells, the method comprising the steps of:

breaking down an area of the system memory into three AAL1's, AAL3/4's, and AAL5's user data area;

determining whether or not the SSID is using the double port RAM when the ATM cells are transmitted from the physical layer, and analyzing the transmitted ATM cells and reading an application layer level when the SSID is using the double port RAM;

temporarily storing the ATM cells transmitted to the user data with AAL1 if the user data read is for AAL1;

extracting control information of the ATM cells temporarily stored in the system memory, generating an interrupt to the SSID to obtain the use of the double port RAM and storing the ATM cells of the system memory by using control information if there is a reply from the SSID;

generating an interrupt to the SSID against the use of the double port when the SSID is not using the double port RAM and storing the ATM cells in the double port RAM if there is the reply from the SSID;

reading the ATM cells stored in the double port RAM using the SSID based on control information of the ATM cells when transmitting the ATM cells; and formatting the ATM cells to be suitable for a UTOPIA interface and transmitting the ATM cells to the physical layer.

2. An asynchronous transfer mode adaptation layer (AAL) processing method using a central processing unit in an asynchronous transfer mode (ATM) terminal, the ATM terminal including a system memory for temporarily storing the ATM cells, a software segmentation and reassembly interface device (SSID) connected with a physical layer to interface with the physical layer the ATM cells, a double port RAM connected with the SSID for storing and drawing the ATM cells, and a central processing unit connected with the SSID for interfacing control information and for controlling a transmission and a reception of the ATM cells, the method comprising the steps of:

determining whether or not the central processing unit is using the double port RAM when the ATM cells are transmitted from the physical layer to the SSID;

transmitting an interrupt to the central processing unit to obtain the use of the double port RAM and storing the ATM cells in the double port RAM if there is a reply from the SSID;

immediately storing the ATM cells in the double port RAM when the central processing unit is not using the double port RAM;

reading the sequence number of the ATM cells and reading control information of the ATM cells stored in the double port RAM if the sequence number is 8, and transmitting control information to the central processing unit;

after obtaining the use of the double port RAM in the central processing unit receiving control information, reading the ATM cells from the double port RAM;

reassembling and converting the ATM cells into a convergence sublay-protocol data units (CS-PDU); and converting the CS-PDU data into a user data and transmitting it to the physical layer.

3. An asynchronous transfer mode adaptation layer (AAL) processing method using a central processing unit in an asynchronous transfer mode (ATM) terminal, the ATM terminal including a system memory for temporarily storing the ATM cells, a software segmentation and reassembly interface device (SSID) connected with a physical layer to interface with the physical layer the ATM cells, a double port RAM connected with the SSID for storing and drawing the ATM cells, and a central processing unit connected with the SSID for interfacing control information and for controlling a transmission and a reception of the ATM cells, the method comprising the steps of:

breaking down an area of the system memory into three AAL1's, AAL3/4's, and AAL5's user data area;

determining whether or not the SSID is using the double port RAM when the ATM cells are transmitted from the physical layer, and analyzing the transmitted ATM cells and reading an application layer level when the SSID is using the double port RAM;

temporarily storing the ATM cells, transmitted to the user data read for the AAL3/4 or AAL5, in the system memory if the user data read is AAL3/4 or AAL5;e determining whether or not the ATM cells stored in the system memory include a trailer of a convergence sublay-protocol data unit (CS-PDU) and extracting control information of the ATM cells when the ATM cells include the trailer of the CS-PDU;

generating an interrupt to the SSID to obtain the use of the double port RAM and storing the ATM cells in the double port RAM by using the read control information if there is a reply from the SSID;

generating an interrupt to the SSID against the use of the double port when the SSID is not using the double port RAM and storing the ATM cells in the double port RAM if there is the reply from the SSID;

reading the ATM cells stored in the double port RAM using the SSID based on control information of the ATM cells when transmitting the ATM cells; and formatting the ATM cells to be suitable for a UTOPIA interface and transmitting the ATM cells to the physical layer.

4. An asynchronous transfer mode adaptation layer (AAL) processing method using a central processing unit in an asynchronous transfer mode (ATM) terminal, the ATM terminal including a system memory for temporarily storing the ATM cells, a software segmentation and reassembly interface device (SSID) connected with a physical layer to interface with the physical layer the ATM cells, a double port RAM connected with the SSID for storing and drawing the ATM cells, and a central processing unit connected with the SSID for interfacing control information and for controlling a transmission and a reception of the ATM cells, the method comprising the steps of:

determining whether or not the central processing unit is using the double port RAM when the ATM cells are transmitted from the physical layer to the SSID;

transmitting an interrupt to the central processing unit to obtain the use of the double port RAM when the central processing unit is using the double port RAM, and storing the ATM cells in the double port RAM if there is a reply from the SSID;

immediately storing the ATM cells in the double port RAM when the central processing unit is not using the double port RAM;

determining whether or not the ATM cells stored in the system memory include a trailer of a convergence sublay-protocol data unit (CS-PDU) in the system memory and extracting control information of the ATM cells and transmitting it to the central processing unit when the ATM cells include the trailer of the CS-PDU;

after obtaining the use of the double port RAM in the central processing unit receiving control information, reading the ATM cells from the double port RAM;

reassembling and converting the ATM cells into a convergence sublay-protocol data unit (CS-PDU); and converting the CS-PDU data into a user data and transmitting it to the physical layer.

5. An asynchronous transfer mode adaptation layer (AAL) processing method using a central processing unit in an asynchronous transfer mode (ATM) terminal, the ATM terminal including a system memory for temporarily storing the ATM cells, a software segmentation and reassembly interface device (SSID) connected with a physical layer to interface with the physical layer the ATM cells, a double port RAM connected with the SSID for storing and drawing the ATM cells, and a central processing unit connected with the SSID for interfacing control information and for controlling a transmission and a reception of the ATM cells, the method comprising the steps of:

determining whether or not the SSID is using the double port RAM if an interrupt is generated, and immediately obtaining the use of the double port RAM when the SSID is not using the double port RAM;

determining whether or not the SSID is reading the double port RAM when the SSID is using the double port RAM and immediately obtaining the use of the double port RAM and, at the same time, abandoning the ATM cells and generating an operation and management (OAM) cell when the SSID is reading the double port RAM;

disregarding the interrupt transmitted from the central processing unit and maintaining the reading state until finishing the reading of the ATM cells when the SSID is reading the double port RAM;

converting the ATM cells to correspond to a UTOPIA interface format when the SSID finishes the reading of the ATM cells, and transmitting the ATM cells to the physical layer.

6. An asynchronous transfer mode adaptation layer (AAL) processing method using a central processing unit in an asynchronous transfer mode (ATM) terminal, the ATM terminal including a system memory for temporarily storing the ATM cells, a software segmentation and reassembly interface device (SSID) connected with a physical layer to interface with the physical layer the ATM cells, a double port RAM connected with the SSID for storing and drawing the ATM cells, and a central processing unit connected with the SSID for interfacing control information and for controlling a transmission and a reception of the ATM cells, the method comprising the steps of:

breaking down an area of the system memory into three AAL1's, AAL3/4's, and AAL5's user data area;

determining whether or not the central processing unit is using the double processing unit when an interrupt is generated after breaking down the area, and obtaining the use of the double port RAM when the central processing unit is not using the double port RAM;

determining whether or not the central processing unit is reading the double processing unit when the central processing unit is using the double processing unit, and obtaining the use of the double port RAM when the central processing unit is reading the double port RAM;

stopping the reading of the ATM cells by the central processing unit transferred the use of the double port RAM, and abandoning the ATM cells;

transferring the use of the double port RAM to the SSID when the interrupt is generated if the central processing unit is using the double port RAM but not reading the double port RAM;

analyzing an application layer level of the ATM cells and temporarily storing the ATM cells in a corresponding area of the system memory;

determining whether or not the ATM cells stored in the system memory include a trailer of a convergence sublay-protocol data unit (CS-PDU) and extracting control information of the ATM cells when the ATM cells include the trailer of the CS-PDU; and generating the interrupt to the SSID against the use of the double port RAM, obtaining the use of the double port RAM if there is a reply to the interrupt, reading the ATM cells stored in the system memory, storing the ATM cells in the double port RAM and transmitting control information of the ATM cells to the SSID.

\* \* \* \* \*